(12) United States Patent
Sharma (10) Patent No.: US 8,706,038 B2
(45) Date of Patent: *Apr. 22, 2014

(54) WIRELESS EARPHONE FOR USE IN BLUETOOTH PICONETS

(71) Applicant: Agere Systems, LLC, Allentown, PA (US)

(72) Inventor: Sanandan Sharma, Bangalore (IN)

(73) Assignee: Agere Systems LLC, Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/855,831

(22) Filed: Apr. 3, 2013

(65) Prior Publication Data

US 2013/0273849 A1    Oct. 17, 2013

Related U.S. Application Data (62) Division of application No. 11/692,720, filed on Mar. 28, 2007, now Pat. No. 8,433,243.

(51) Int. Cl.
*H04B 7/00* (2006.01)

(52) U.S. Cl.
USPC ........................................ 455/41.2; 455/41.3

(58) Field of Classification Search
USPC .......... 455/41.3, 41.2, 41.1, 575.2, 550.1, 88, 455/11.1, 13.1, 16–18; 379/430, 428.02, 379/420.04; 381/334, 370, 74, 309, 379, 381/330, 380, 381, 77, 79, 80–81, 311, 381/384; 370/351, 390, 395.63, 400, 425, 370/492, 501, 254, 256

See application file for complete search history.

(56) References Cited

U.S. PATENT DOCUMENTS

| | | | |
|---|---|---|---|
| 8,253,693 B2 * | 8/2012 | Buil et al. | 345/173 |
| 8,433,243 B2 * | 4/2013 | Sharma | 455/41.2 |
| 2004/0147267 A1 * | 7/2004 | Hill et al. | 455/456.1 |
| 2005/0265552 A1 * | 12/2005 | Olson et al. | 380/270 |
| 2006/0072525 A1 * | 4/2006 | Hillyard et al. | 370/338 |
| 2007/0093294 A1 * | 4/2007 | Serafat et al. | 463/39 |
| 2007/0211624 A1 * | 9/2007 | Schmidt et al. | 370/225 |

* cited by examiner

*Primary Examiner* — Nay A Maung
*Assistant Examiner* — Angelica M Perez (57) ABSTRACT

An audio device includes a Bluetooth receiver, a Bluetooth transmitter, a speaker and a housing. The Bluetooth receiver is capable of wirelessly receiving signals in at least two audio channels. The Bluetooth transmitter is capable of wirelessly retransmitting at least a first one of the two audio channels. The speaker plays the second one of the two audio channels. The housing contains the Bluetooth receiver, the Bluetooth transmitter, and the ear phone. The housing is shaped to fit in or on an ear of a user.

20 Claims, 6 Drawing Sheets

WIRELESS EARPHONE FOR USE IN
BLUETOOTH PICONETS

This Application is a divisional of application Ser. No. 11/692,720, filed Mar. 28, 2007, now issued as U.S. Pat. No. 8,433,243, the teachings of which are incorporated herein in their entireties by reference.

FIELD OF THE INVENTION

The present invention relates to the field of consumer electronics generally, and earphones in particular.

BACKGROUND

High quality Bluetooth audio earphones conform to the Advanced Audio Distribution Profile (A2DP). Currently, so-called Bluetooth "Wireless" headsets use a wireless connection to transfer stereo audio signals between the audio source and a first one of two earphones. The first earphone contains a wireless receiver. One of the audio channels is played in the first earphone, and the other audio channel is provided to the second earphone by way of a wired link. This increases the physical size of the earphone set and makes the earphones more conspicuous and difficult to use. Also, their large size makes them inconvenient to carry. A typical stereo Bluetooth earphone set is much larger than a typical flash or hard disk based music player, such as an "IPOD"® (sold by Apple, Inc. of Cupertino, Calif.).

Bluetooth A2DP signal sources can theoretically support up to seven earphones—the protocol allows a single Bluetooth master to interleave traffic between up to seven simultaneously active slaves in a single piconet. (A Bluetooth piconet is a temporary wireless network formed between Bluetooth devices. Devices participating in a Bluetooth piconet use the same frequency hop spread spectrum (FHSS) sequence.) In practice, however, the maximum number of A2DP links is fewer than seven, because of the lack of bandwidth inside a single Bluetooth piconet. It is common to aggregate up to five of the available time slots for a transmission to a single slave, reducing the amount of bandwidth available for the rest of the slaves. The inventor is not aware of any commercially available A2DP source that can transmit signals to more than one A2DP earphone at a time.

Improved Bluetooth earphones are desired.

SUMMARY OF THE INVENTION

In some embodiments, an audio device comprises a Bluetooth receiver capable of wirelessly receiving signals in at least two audio channels. A Bluetooth transmitter is capable of wirelessly retransmitting at least a first one of the two audio channels. A speaker plays the second one of the two audio channels. A housing contains the Bluetooth receiver, the Bluetooth transmitter, and the ear phone. The housing is shaped to fit in or on an ear of a user.

In some embodiments, an audio device comprises a Bluetooth Advanced Audio Distribution Profile receiver capable of wirelessly receiving signals in at least one high-fidelity audio channel. A speaker plays the at least one high-fidelity audio channel. A housing contains the Bluetooth Advanced Audio Distribution Profile receiver and the ear phone. The housing is shaped to fit in or on an ear of a user.

In some embodiments, an audio system comprises first and second audio devices. The second audio device is mechanically unconnected to, and positionable independently from, the first audio device. The first audio device has a Bluetooth receiver capable of receiving signals in at least two audio channels. The second audio device has a Bluetooth receiver capable of receiving signals in at least a first one of the two audio channels. The first audio device has a Bluetooth transmitter capable of retransmitting at least the first one of the two audio channels to the second audio device. Each audio device has a speaker. The speaker of the first audio device is capable of playing the second one of the two audio channels. The speaker of the second audio device is capable of playing the first one of the two audio channels.

In some embodiments, a method of operating audio equipment comprises: receiving signals representing two audio channels wirelessly with a first Bluetooth audio device; playing a first one of the two audio channels with the first Bluetooth audio device; transmitting signals representing the second one of the two audio channels wirelessly to a second Bluetooth device, the second Bluetooth device mechanically unconnected to the first Bluetooth device; and playing the second audio channel with the second Bluetooth device simultaneously while playing the first audio channel with the first Bluetooth device.

In some embodiments, a method of operating audio equipment comprises: receiving signals representing two audio channels wirelessly with a first pair of Bluetooth audio devices by way of a first Bluetooth piconet; playing the two audio channels with the first pair of Bluetooth audio devices; and transmitting signals representing the two audio channels wirelessly from the first pair of Bluetooth audio devices to a second pair of Bluetooth audio devices by way of a second Bluetooth piconet, the second pair of Bluetooth audio devices mechanically unconnected to the first pair of Bluetooth audio devices.

DETAILED DESCRIPTION

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Figure 1:
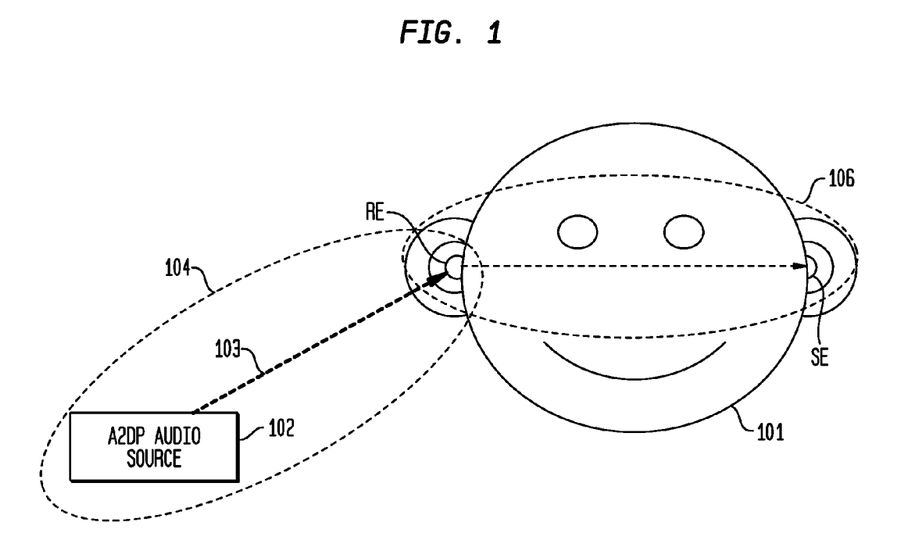
FIG. 1 is a schematic diagram showing operation of a pair of audio devices according to one embodiment.

FIG. 1 shows a method of operating audio equipment, including earphones. In some embodiments, the earphones may be divided into two subsets. A first subset is referred to herein as "sink earphones" (SE), shown in FIGS. 1, 2 and 4, and a second subset is referred to herein as "retransmitter earphones" (RE), shown in FIGS. 1-3. The SE receives an A2DP transmission and plays it. In some embodiments, the SE decodes and plays a single channel of a stereo transmission depending on the system design. The RE plays one channel and transmits the other channel (or transmits both channels) to a destination. As used herein, the term "earphone" is not limited to a particular shape, and may encompass ear buds (e.g., FIG. 5), over-the-ear configurations (e.g., FIG. 6), or other audio device housing shapes.

The first Bluetooth audio device RE is positioned in, on or proximate to a first ear of a user 101, and the second Bluetooth device SE is positioned in, on or proximate to a second ear of the first user. As used herein, the phrase, "in the ear" refers to embodiments in which the entire device fits in the ear, as well as embodiments in which a first portion of the device fits in the ear and a second portion of the device protrudes from the ear. Signals 103 representing two audio channels are received wirelessly by the first Bluetooth audio device RE. A first one of the two audio channels is played by the first Bluetooth audio device RE. Signals representing the second one of the two audio channels are transmitted wirelessly to a second Bluetooth device SE. The second Bluetooth device SE is not mechanically connected to the first Bluetooth device. The second audio channel is played with the second Bluetooth device SE simultaneously, while playing the first audio channel with the first Bluetooth device RE.

In FIG. 1 the two exemplary audio devices RE, SE are referred to herein as Completely Wireless high fidelity Bluetooth Audio Earphones (CWBAE). CWBAE do not require wired connections between the earphones RE, SE and the audio signal source. Moreover, CWBAE do not require any external wired connection between the left and right earphones RE, SE. One of ordinary skill in the art will understand that an individual CWBAE audio device (RE or SE) may include internal wires, conductors and/or printed circuit wirings within the housing 302, 402, 502 or 602 (shown in FIGS. 3-6, respectively) of a single ear bud 500 or over-the-ear type earphone 600. CWBAE eliminate the last external connecting wire that was required between the right and left earphones in conventional "wireless" earphone sets.

Figure 3:
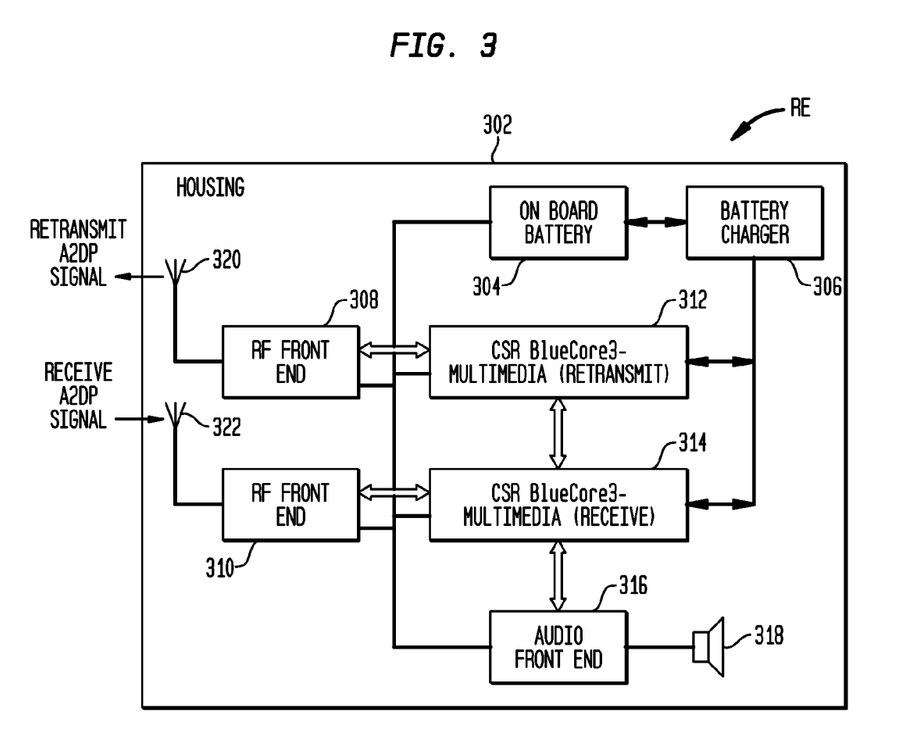
FIG. 3 is a block diagram of one exemplary embodiment of the retransmitting earphone (RE) shown in FIG. 1.
Figure 4:
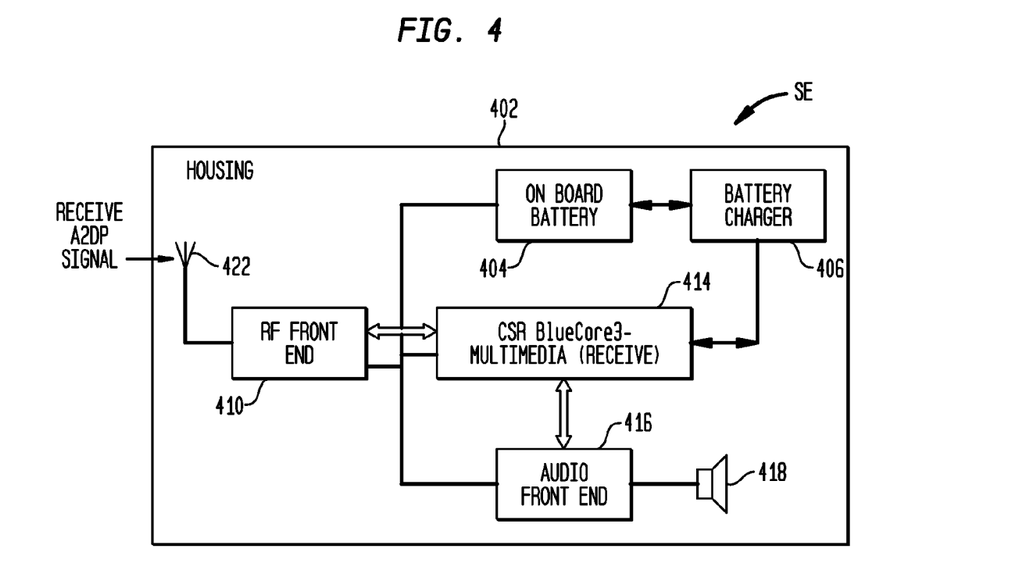
FIG. 4 is a block diagram of one exemplary embodiment of the sink earphone (SE) shown in FIG. 1.

The audio system of FIG. 1 includes first and second audio devices RE and SE. The second audio device SE is mechanically unconnected to, and positionable independently from, the first audio device RE. The first audio device RE has a Bluetooth receiver 314 (shown in FIG. 3) capable of receiving signals in at least two audio channels. The second audio device SE has a Bluetooth receiver 414 (shown in FIG. 4) capable of receiving signals in at least a first one of the two audio channels. The first audio device RE has a Bluetooth transmitter 312 (FIG. 3) capable of retransmitting at least the first one of the two audio channels to the second audio device SE. Each audio device has a speaker 318, 418 (FIGS. 3 and 4). The speaker 318 of the first audio device RE is capable of playing the second one of the two audio channels. The speaker 418 of the second audio device SE is capable of playing the first one of the two audio channels.

As shown in FIG. 1, the audio device RE is capable of operating with two separate Bluetooth addresses simultaneously, and is capable of participating in two separate Bluetooth piconets 104, 106 simultaneously using a respectively different Bluetooth address in each of the piconets 104, 106. This facilitates the wireless transmission of one (or both) audio channels from the RE to the SE.

Figure 2:
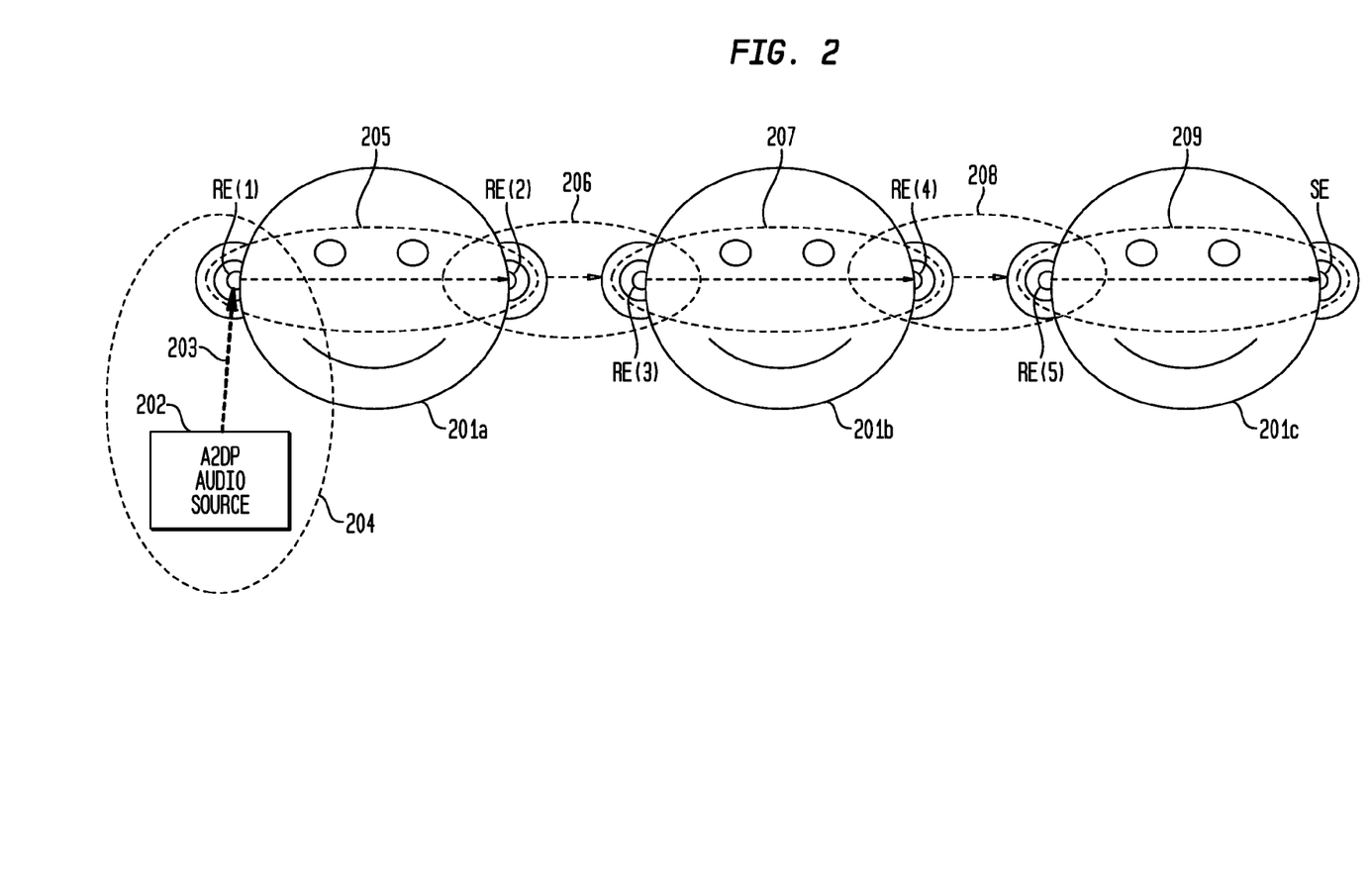
FIG. 2 is a schematic diagram showing operation of a plurality of pairs of audio devices.

FIG. 2 shows a multi-user method of operating the audio devices. At a high level, FIG. 2 shows a method of operating audio equipment, comprising: receiving signals representing two audio channels wirelessly with a first pair of Bluetooth audio devices RE(1), RE(2) by way of a first Bluetooth piconet 204; playing the two audio channels with the first pair of Bluetooth audio devices RE(1), RE(2); transmitting signals representing the two audio channels wirelessly from the first pair of Bluetooth audio devices RE(1), RE(2) to a second pair of Bluetooth audio devices RE(3), RE(4) by way of a second Bluetooth piconet 206, where the second pair of Bluetooth audio devices RE(3), RE(4) are not mechanically connected to the first pair of Bluetooth audio devices RE(1), RE(2).

In greater detail, signals 203 representing the two audio channels are transmitted wirelessly from the first Bluetooth device RE(1) coupled to an ear of a first user 201a to the second Bluetooth device RE(2) coupled to the other ear of the first user 201a. The second Bluetooth device RE(2) is not mechanically connected to the first Bluetooth device RE(1). The signals representing the two audio channels are then transmitted wirelessly from the second Bluetooth device RE(2) to a third Bluetooth device RE(3) coupled to an ear of a second user 201b. The third Bluetooth device RE(3) is mechanically unconnected to the first and second Bluetooth devices RE(1) and RE(2). The first audio channel is played by the third Bluetooth device RE(3). Signals representing the second one of the two audio channels are transmitted wirelessly from the third Bluetooth device RE(3) to a fourth Bluetooth device RE(4) coupled to a second ear of the second user 201b. The fourth Bluetooth device RE(4) is mechanically unconnected to the first, second and third Bluetooth devices RE(1)-RE(3). The second audio channel is played by the fourth Bluetooth device RE(4). One of ordinary skill can readily recognize how the additional transmissions to the fifth and sixth devices RE(5) and SE are performed in the same manner.

As shown in FIG. 2, the first Bluetooth device RE(1) is operated in a first Bluetooth piconet 205. The third Bluetooth device RE(3) is operated in a second Bluetooth piconet 206. The second Bluetooth device RE(2) is operated in both the first and second Bluetooth piconets 205 and 206 simultaneously, with the second device RE(2) using different Bluetooth addresses and interfaces in the two piconets.

The RE receives an A2DP stream containing stereo signals from an audio source and then retransmits a modified (or unmodified) version of the A2DP stream to another SE or RE. Thus, the RE operates as a Bluetooth repeater for one or both of the audio channels. In some embodiments (FIG. 2), the RE simultaneously retransmits the full audio stream (both channels) at the same time that one channel is being played by the RE. In some embodiments (FIG. 1), the RE only retransmits one of the audio channels while playing the other audio channel (as shown in FIG. 1). FIG. 1 shows a user wearing a set of earphones, include an SE and an RE. In some embodiments, a delay may be added by the RE or SE to account for the delay in the audio path from RE to SE or from RE to RE. For example, there may be a signal propagation delay or a delay associated with buffering data, to ensure that a continuous stream can be played.

The RE has two completely separate Bluetooth physical interfaces. The RE has two separate Bluetooth addresses and participates in two completely independent Bluetooth piconets simultaneously. In some embodiments, CWBAE devices foam a new piconet for each A2DP stream. In FIG. 1, the audio source and the RE form a first piconet 104 and the RE and SE form a separate piconet 106.

The RE may be a Bluetooth Master in both piconets, or a slave in both piconets, or a slave in one piconet and a master in another piconet. Even if the RE is master in both piconets, the hopping sequence and the link keys for the Bluetooth link will be different in the two piconets, since the RE uses different Bluetooth addresses and interfaces in the two piconets.

In some embodiments (e.g., FIG. 2), CWBAE can seamlessly support multiple users 201a-201c listening to audio signals from the same audio source 102, even if the audio signal source 102 is only capable of transmitting signals to a single user 201a. CWBAE can also extend the physical range of Bluetooth audio transmission without the need for any change in the existing Bluetooth Advanced Audio Distribution Profile (A2DP) protocol or the existing audio signal source 102. CWBAE devices are not subject to the limitations on the number of earphones that can be supported in a system having a single Bluetooth A2DP source 102. Any number of users 201a-201c can be supported using CWBAE even if the A2DP audio source is only capable of streaming music to a single one of the earphones.

FIG. 2 shows a plurality of retransmitting earphones RE(1) to RE(5). Each audio device RE(1)-RE(5) operates with two separate Bluetooth addresses simultaneously, and participates in two of the separate Bluetooth piconets 204-209 simultaneously using a respectively different Bluetooth address in each of the two piconets. This facilitates the wireless transmission of both audio channels from A2DP audio source 202 to RE(1) in piconet 204; from RE(1) to RE(2) in piconet 205; from RE(2) to RE(3) in piconet 206; from RE(3) to RE(4) in piconet 207; from RE(4) to RE(5) in piconet 208; and wireless transmission of one or both channels from RE(5) to the SE in piconet 209.

In FIG. 2, the second audio device RE(2) includes two Bluetooth physical interfaces 312, 314 (shown in FIG. 3) with respectively different Bluetooth addresses. The Bluetooth transmitter 312 of the first audio device RE(1) is capable of transmitting both of the two audio channels to the Bluetooth receiver 314 of the second audio device RE(2).

The Bluetooth receiver 314 of the second audio device RE(2) is capable of receiving both of the two audio channels from the Bluetooth transmitter of the first audio device RE(1). The second audio device RE(2) is capable of participating in two separate Bluetooth piconets 205, 206 simultaneously using a respectively different Bluetooth address in each of the piconets.

Although FIG. 2 shows an example in which the distal earphone of the last user 201c in the chain is an SE, the distal earphone of user 201c may alternatively be another RE. In some embodiments (not shown), the RE may include a manually operable transmitter switch that enables the user 201c to turn off the retransmitter interface 312 within the RE to extend the battery life, if the RE is the last audio device in the last piconet in the chain.

One of ordinary skill in the art recognizes that, by providing two Bluetooth interfaces in each RE device, and operating each RE in a respectively separate piconet, the operating method shown in FIG. 2 avoids degradation in available bandwidth hence audio quality that occurs with a larger number of slaves with one master in a single piconet.

FIG. 2 shows how CWBAE may be used for multiple users listening to music from the same audio source. In FIG. 2, only the first user 201a receives the audio stream directly from the audio source. For the first user 201a, both the earphones are of the RE type. The left earphone RE(1) receives the audio stream and retransmits it to the right earphone RE(2). The right earphone RE(2) retransmits to the left earphone RE(3) of the second user 201b, and so on . As shown in FIG. 2, a respective piconet is provided for each audio stream. Three users are shown for exemplary purposes, but there is no limit on the number of users than can be chained in the manner shown. The only limiting factor is radio interference. For a large number of users, the users may be physically spread out in such a way that the piconet overlap in space is minimal. Because Bluetooth is intended for relatively short distances, this may be used in several situations. Also, with multi user CWBAE, music may be transmitted using Bluetooth over much larger distance than would be possible using A2DP in a single piconet.

Although examples are described above using CWBAE, in other embodiments, the chaining capability can be used for the design of a wirelessly networked public address system or a public area music system. For example, in a public address system, multiple members of an audience (or the entire audience) can hear a speaker, or a translation of a speech being given, using CWBAE.

FIG. 3 is a block diagram of an exemplary audio device RE, suitable for use according to the methods of FIGS. 1 and 2. The device RE is contained within a housing 302, which may be an ear bud type housing 502 (FIG. 5) or an over-the-ear type housing 602 (FIG. 6), or another suitable design for coupling the device RE in, on or proximate to an ear of a user. The device RE has an on-board battery 304, and optionally includes a battery charger 306. In alternative embodiments, the battery 304 may be a small, replaceable non-proprietary battery, and the battery charger 306 may be omitted. The exemplary RE device includes a Bluetooth A2DP receiver 314 capable of wirelessly receiving signals in at least one high-fidelity audio channel, and an A2DP transmitter 312 for re-transmitting the received signals. The RE device further includes a speaker 318 that plays the at least one high-fidelity audio channel.

The receiver interface 312 and re-transmitter interface 314 may be modules of the same type. For example each of the modules 312 and 314 may be a Bluecore-3 Multimedia Bluetooth module sold by Cambridge Silicon Radio, Ltd. of Cambridge, UK. This module includes receive and transmit functions. Other types of Bluetooth modules may be used, including but not limited to modules implemented in commercially available IC chips, or an application specific integrated circuit (ASIC). Each of the Bluetooth modules 312 and 314 has a respective RF front end 308, 310 and a respective antenna element 320, 322.

The inclusion of separate Bluetooth physical interface modules 312 and 314 allow operation of the retransmission and receiving functions in separate piconets, independently of each other. For example, the two separate Bluetooth physical interface modules 312 and 314 provide a means for enabling the device (e.g., RE(2)) to operate as a master in a first one of the Bluetooth piconets (e.g., 206), while simultaneously operating as a slave in a second one of the Bluetooth piconets (e.g., 205).

Alternatively, the two separate Bluetooth physical interface modules 312 and 314 can provide a means for enabling the device (e.g., RE(2)) to operate as a slave in a first one of the Bluetooth piconets (e.g., 206), while simultaneously operating as a slave in a second one of the Bluetooth piconets (e.g., 205).

Alternatively, the two separate Bluetooth physical interface modules 312 and 314 can provide a means for enabling the device (e.g., RE(2)) to operate as a master in a first one of the Bluetooth piconets (e.g., 206), while simultaneously operating as a master in a second one of the Bluetooth piconets (e.g., 205).

In the audio system of FIGS. 2 and 3, the second audio device RE(2) has a Bluetooth transmitter 312 (FIG. 3) capable of transmitting both of the two audio channels. The system further comprises a third audio device R(3) not mechanically connected to, and positionable independently from, the first and second audio devices R(1) and R(2). The third audio device R(3) comprises a Bluetooth receiver 314 capable of receiving signals in the two audio channels from the second audio device R(2), a Bluetooth transmitter 312 capable of retransmitting at least the first two audio channels, and a speaker 318 for playing the second audio channel.

In some embodiments, the RE device has a mechanism for delaying the playing of the second one of the two audio channels by a delay period. For example, the audio front end module 316 may include a delay circuit that delays the playing of the signals in the speaker 318 by a propagation time for the retransmitted signals from the audio device RE to a recipient of the retransmitted signals (such as an SE or RE device worn on the other ear by the same user).

FIG. 4 is a block diagram of an exemplary SE device. In the example of FIG. 4, the SE comprises a subset of the components included in the RE device of FIG. 3. Elements of FIG. 4 corresponding to like elements of FIG. 3 are indicated by the same reference numeral, increased by 100 in FIG. 4. These common elements may include housing 402, on-board battery 404, battery charger 406, Bluetooth receive module 414, Audio front end 416, earphone speaker 418, RF front end 410 and RF antenna 422. In some embodiments, the Bluetooth receiver module 414 is a full BlueCore3 system by Cambridge Silicon Radio, Ltd. of Cambridge, UK.

In preferred embodiments, CWBAE earphones do not have any wired connections between earphones 500 or 600, or between any of the earphones 500, 600 and the audio signal source 102. This enables design of very elegant and ergonomic wireless earphones.

Figure 5A:
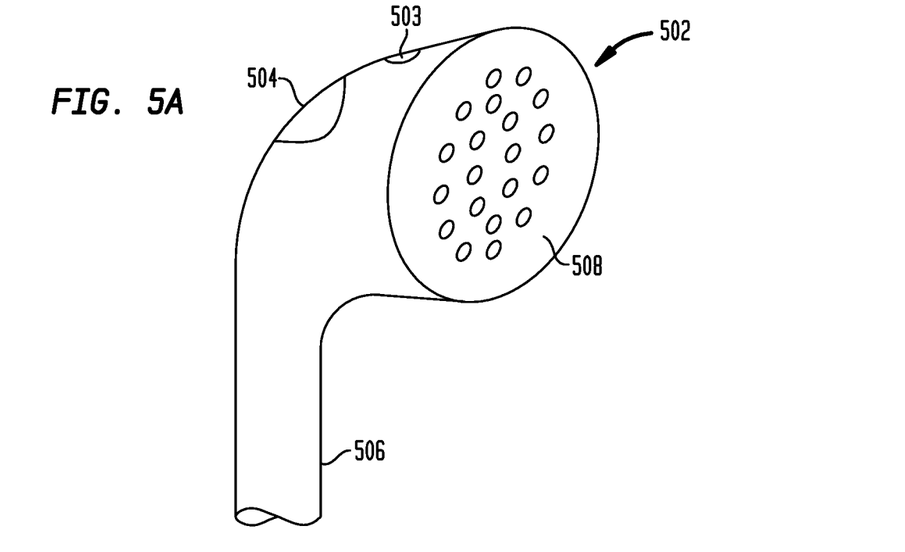
FIGS. 5A-5C are side, front and rear elevation views of an exemplary ear bud (RE or SE) according to one embodiment of the audio device of FIG. 1.
Figure 5B:
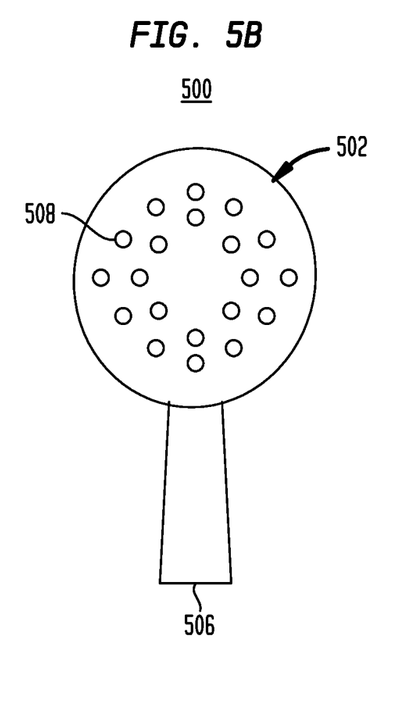
Figure 5C:
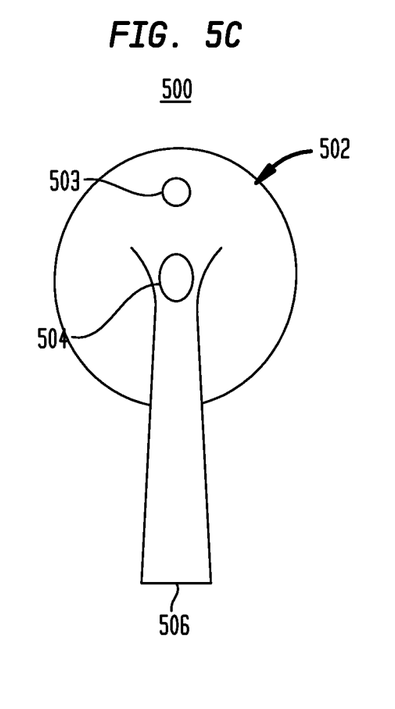
Figure 6:
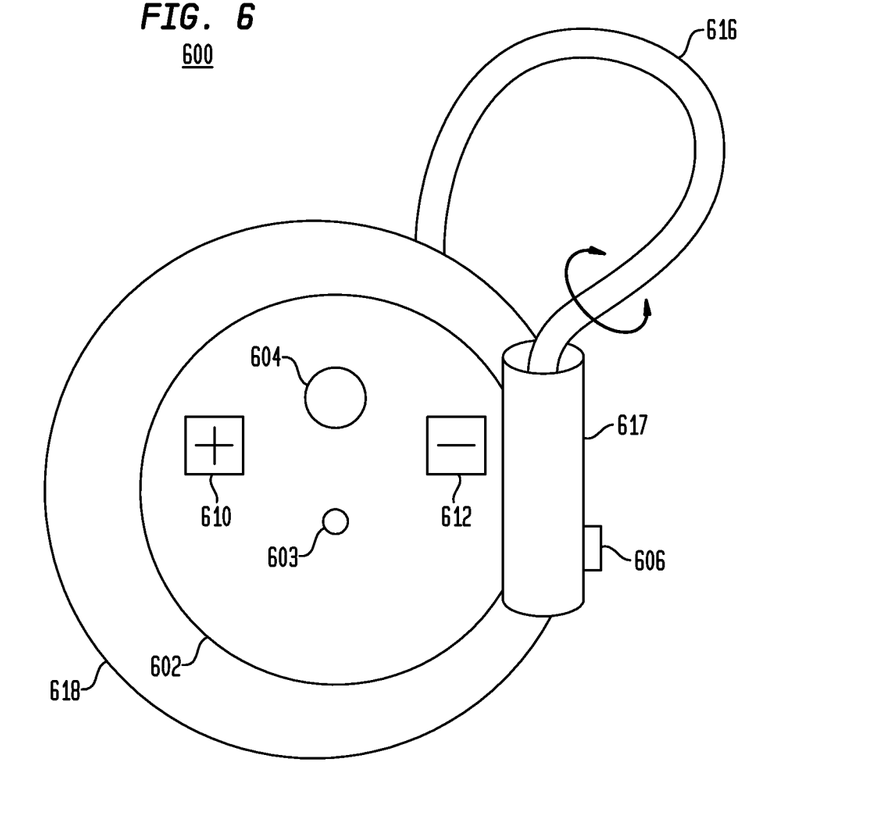
FIG. 6 is a diagram of an exemplary earphone (RE or SE) according to one embodiment of the audio device of FIG. 1.

FIGS. 5A-5C show an exemplary design for an earphone in the fowl of an ear bud 500 containing the modules shown in FIG. 3 or 4, within a housing 502. Because CWBAE removes the need for any wired connections, the exemplary audio devices can optionally be built as tiny ear buds 500 that fit into each ear, and are barely visible to a person in front of or behind the user. CWBAE earphones 500, 600 can be designed to be much lighter and smaller physically than typical wireless earphones. This can make them easier to wear for prolonged periods of time.

Ear bud 500 may have a variety of controls. In one example, as shown in FIGS. 5A to 5C, a push-button control 504 is provided for power/pairing mode selection. For example, a first push of the button 504 can turn on the device, and subsequent pushes of the button 504 can set the device to operate as an RE node in two piconets or as an SE node in the terminal piconet of a chain of piconets. One or more indicator lights 503 may be provided. For example, one or more indicator LEDs 503 may provide Bluetooth status, charging status, and/or battery level status. A connector 506 may be provided for recharging the battery 304, 404. For example, port 506 may be a USB mini-B port, or other interface providing a power connection. A speaker portion 508 may have an ergonomic shape for fitting comfortably in the ear of the user, and one or more vents for audio. This is only one example, and a variety of controls and/or indicators may be included in ear bud 500.

Although the embodiment of FIG. 5 protrudes from the ear of the user, other embodiments may include smaller components to permit the entire device to fit within the ear.

FIG. 6 shows another example of an earphone 600 shaped to be worn over an ear of the user. Earphone 600 has a housing 602 containing the modules shown in FIG. 3 or 4. The earphone 600 may include controls similar to those included in the ear bud 500, such as a push-button control 604 for power/pairing mode selection, a USB mini-B port 608, or other interface providing a power connection for recharging the battery 304, 404, and one or more indicator lights 603 such as LEDs that provide Bluetooth status, charging status, or battery level status. Because of the larger size of housing 602, additional controls and/or indicators may be provided on the housing 602. For example, volume control buttons 610 and 612 may be provided.

Earphone 600 may have a clip 616 for supporting the earphone on the ear of the user. The clip 616 may optionally be pivotally mounted to a clip base 617 attached to the housing 602, or to a sleeve (not shown) integrally formed in the housing. A foam covering 618 may optionally be provided to enhance user comfort. Many other physical configurations may be used.

Although the exemplary embodiments of FIGS. 5 and 6 show earphones that are positioned in or on an ear of the user, other configurations can be used to position the earphones proximate to the ears of the user. For example, earphones according to FIG. 3 or 4 may be built into articles of apparel (such as hats, eyeglasses, barrettes, scrunchies, wigs, toupees, or the like), or may be inserted in suitably sized pockets in such articles of apparel. All of these items of apparel can include the earphones according to FIG. 3 or 4 without requiring external wires to mechanically or electrically connect the pair of earphones within the item of apparel.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. An audio device, comprising:
 a first ear phone comprising;
  a Bluetooth Advanced Audio Distribution Profile receiver configured to wirelessly receive signals in at least two high-fidelity audio channels in a first Bluetooth piconet:
  a speaker that plays at least a first one of the at least two high-fidelity audio channels;
  a Bluetooth Advanced Audio Distribution Profile transmitter configured to wirelessly retransmit at least a second one of the at least two high-fidelity audio channels in a second Bluetooth piconet: and
  a housing that contains the Bluetooth Advanced Audio Distribution Profile receiver and the speaker, the housing shaped to fit in or on an ear of a user,
  wherein the first ear phone is configured to operate with two separate Bluetooth addresses simultaneously, a first Bluetooth address for the first Bluetooth piconet and a second Bluetooth address for the second Bluetooth piconet. the first car phone configured to communicate the at least two high-fidelity audio channels in the two separate Bluetooth piconets simultaneously employing the two separate Bluetooth addresses, the first ear phone further configured to operate as a slave device in the first Bluetooth piconet while simultaneously operating as a master in the second Bluetooth piconet.

2. The audio device of claim 1, wherein the Bluetooth Advanced Audio Distribution Profile transmitter is configured to retransmit at least one of the at least two high-fidelity audio channels to a recipient device.

3. The audio device of claim 2, wherein the recipient device is a second ear phone comprising:
a Bluetooth Advanced Audio Distribution Profile receiver configured to wirelessly receive signals in the at least one high-fidelity audio channel retransmitted from the first ear phone in the second Bluetooth piconet;
a speaker that plays the at least one high-fidelity audio channel; and
a housing that contains the Bluetooth Advanced Audio Distribution Profile receiver and the speaker, the housing shaped to fit in or on an ear of a user.

4. The audio device of claim 3, wherein the second ear phone is configured to operate as a slave device in the second Bluetooth piconet.

5. The audio device of claim 3, wherein the second ear phone further comprises a Bluetooth Advanced Audio Distribution Profile transmitter configured to wirelessly retransmit at least a second one of the at least two high-fidelity audio channels to a third Bluetooth device in a third Bluetooth piconet.

6. The audio device of claim 2, wherein the first ear phone comprises:
a delay mechanism configured to delay playing of at least one of the at least two audio channels by a delay period.

7. The audio device of claim 6, wherein the delay period is a propagation time for the retransmitted signals from the first ear phone to propagate to the recipient device.

8. The audio device of claim 1, wherein the first car phone is configured to operate as a master device in the first Bluetooth piconet and operate simultaneously as a master device in the second Bluetooth picoilet.

9. The audio device of claim 1, wherein the first ear phone is configured to operate as a slave device in the first Bluetooth piconet and operate simultaneously as a slave device in the second Bluetooth piconet.

10. The audio device of claim 1, wherein the first ear phone comprises at least two Bluetooth physical interfaces, the first Bluetooth physical interface associated with the first Bluetooth address for the first Bluetooth piconet and the second Bluetooth physical interface associated with the second Bluetooth address for the second Bluetooth piconet.

11. A method of operating an audio device, comprising:
wirelessly receiving, by a Bluetooth Advanced Audio Distribution Profile receiver of a first ear phone, signals in at least two high-fidelity audio channels in a first Bluetooth piconet;
playing, by a speaker of the first car phone, at least a first one of the at least two high-fidelity audio channels;
wirelessly retransmitting, by a Bluetooth Advanced Audio Distribution Profile transmitter of the first ear phone, at least a second one of the at least two high-fidelity audio channels in a second Bluetooth piconet; and
simultaneously operating the first ear phone with two separate Bluetooth addresses, a first Bluetooth address for the first Bluetooth piconet and a second Bluetooth address for the second Bluetooth piconet, the first ear phone communicating the at least two high-fidelity audio channels in the two separate Bluetooth piconets simultaneously employing the two separate Bluetooth addresses, the first ear phone operating as a slave device in the first Bluetooth piconet while simultaneously operating as a master in the second Bluetooth piconet.

12. The method of claim 11, further comprising:
retransmitting, by the Bluetooth Advanced Audio Distribution Profile transmitter, at least one of the at least two high-fidelity audio channels to a recipient device.

13. The method of claim 12, wherein the recipient device is a second ear phone, the method further comprising:
wirelessly receiving, by a Bluetooth Advanced Audio Distribution Profile receiver of the second ear phone, signals in the at least one high-fidelity audio channel retransmitted from the first car phone in the second Bluetooth piconet;
playing, by a speaker of the second ear phone, the at least one high-fidelity audio channel.

14. The method of claim 13, further comprising:
operating the second ear phone as a slave device in the second Bluetooth piconet.

15. The method of claim 12, further comprising delaying, by as delay mechanism of the first ear phone, playing of at least one of the at least two audio channels by a delay period, wherein the delay period is a propagation time, for the retransmitted signals from the first ear phone to propagate to the recipient device.

16. The method of claim 13, further comprising:
wirelessly retransmitting, by a Bluetooth Advanced Audio Distribution Profile transmitter of the second ear phone, at least a second one of the at least two high-fidelity audio channels to a third Bluetooth device in a third Bluetooth piconet.

17. The method of claim 12, wherein, for the method, each of the first ear phone and the recipient device comprise a housing shaped to fit in or on an ear of a user.

18. The method of claim 11, further comprising:
operating the first ear phone as a roaster device in the first Bluetooth piconet and simultaneously operating the first ear phone as a master device in the second Bluetooth piconet.

19. The method of claim 11, further comprising:
operating the first ear phone as a slave device in the first Bluetooth piconet and simultaneously operating the first ear phone as a slave device in the second Bluetooth piconet.

20. The method of claim 11, wherein, for the method, the first ear phone comprises at least two Bluetooth physical interfaces, the first Bluetooth physical interface associated with the first Bluetooth address for the first Bluetooth piconet and the second Bluetooth physical interface associated with the second Bluetooth address for the second Bluetooth piconet.

* * * * *